No. 12,432. REISSUED JAN. 2, 1906.

J. DEGENHARDT.

SKYLIGHT.

APPLICATION FILED OCT. 14, 1905.

Inventor

J. Degenhardt

Witnesses

C. H. Walker.

H. J. Sullivan

By Wright, Brown, Quinby & May

Attorneys

UNITED STATES PATENT OFFICE.

JOHANNES DEGENHARDT, OF BERLIN, GERMANY, ASSIGNOR TO WILLIAM F. PLASS, OF NEW YORK, N. Y.

SKYLIGHT.

No. 12,432. Specification of Reissued Letters Patent. Reissued Jan. 2, 1906.

Original No. 745,310, dated November 24, 1903. Application for reissue filed October 14, 1905. Serial No. 282,869.

*To all whom it may concern:*

Be it known that I, JOHANNES DEGENHARDT, manufacturer and proprietor of the firm of Fr. Basse Nachf., a subject of the German Emperor, and formerly a resident of 5 Wilhelmstrasse, Cassel, Germany, and now residing at 33 Waldstrasse, Berlin, Germany, have invented new and useful Improvements in Skylights, of which the following is a specification.

This invention relates to improvements in bars used for the support of panes of glass constituting the roofs of greenhouses and other glass-covered buildings and also to improvements in the manner of glazing or fixing together the panes of glass used, the object of the invention being to prevent the sweating of the bars and to collect in the bars the water which eventually trickles through the panes, which bars serve at the same time as channels for this water.

A further object of the invention is to keep the weight of persons going on the roof for repairing or cleaning off the panes and to transfer it directly to the supporting-bars, thus preventing the breakage of the glass panes.

Figure 1:
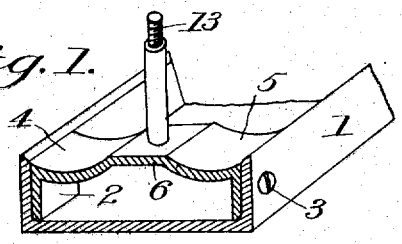
Figure 2:
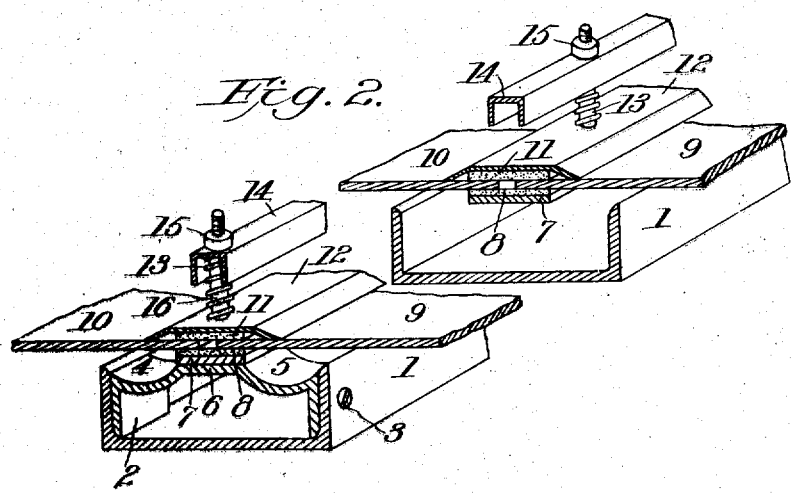
Figure 3:
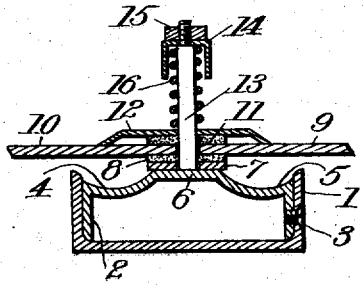

In the accompanying drawings, Figure 1 shows a part of the improved bar in a perspective view. Fig. 2 is a perspective view of the bar with the window-panes inserted. Fig. 3 represents a vertical transverse section in a plane through the spring surrounding one of the uprights which extends between the panes of glass.

The supporting-bar 1 consists of a U-shaped iron which is open at the upper end. Into this supporting-bar 1 brackets 2, of ⊓-shaped iron, are inserted at a suitable distance from each other, with the open end turned down. The brackets 2 are fixed in position by means of screws or rivets 3 or in any other suitable manner. On the upper surface of the brackets 2 two grooves 4 and 5 are provided, one at each end.

On the bridges 6 of the brackets 2, formed by that part of the brackets which is situated between the grooves 4 5, a flat iron bar 7 is placed, which extends over the whole length of the supporting-bar 1. On this flat iron bar 7 a felt strip 8 is placed, on which the window-panes 9 10 are laid. A second felt strip 11 is placed over the adjacent edges of the window-panes 9 10, which felt strip 11 is covered by a cap 12, of sheet metal, lead, or any other suitable material.

The flat iron bar 7, as well as the felt strips 8 11, and the cap 12 have holes for the passage of bolts 13, one of which is screwed into each of the bridges 6, projecting a certain distance above the cap 12. The bolts 13 have a set-off on the upper end, which serves as support for a ⊓-iron 14, running parallel to the supporting-bar 1. This iron 14 is secured in its position by means of screw-nuts 15, screwed to the upper ends of the bolts 13. Spiral springs 16 are coiled around the bolts 13, abutting against the upper surface of the cap 12 and against the lower surface of the iron 14, whereby the ends of the window-panes 9 10 are tightly pressed against their seats.

The ⊓-irons 14 serve as support for the planks to be placed on the roof in case of repair, thus receiving the weight of persons going on the roof and transmitting this weight directly to the bridges 6, brackets 2, and to the supporting-bars 1 by means of the bolts 13, so that no strain is exerted on the glass panes. The glass panes have free play at their adjacent edges, and being elastically supported upon the felt strip 8 they are not liable to break even under the heaviest weight of snow. The water trickling through the panes or sweat-water collecting on the lower surface of the glass panes drops into the supporting-bars 1, which at the same time serve as channels for this collected water. The grooves 4 5 at the sides of the bridges 6 prevent the collecting water from getting to the screws or rivets 3, thus protecting them from rust. An essential advantage of these improved supporting-bars for panes of glass constituting the roofs of greenhouses and other glass-covered buildings is that the glass panes do not rest directly on the supporting-bars 1, so that the hot or warm air from inside the building has access to all parts of the supporting-bars, which are thus prevented from sweating. The great disadvantage of the sweat-water which at present continually drops from the supporting-bars is thus entirely avoided.

Having fully described my invention, what I claim, and desire to secure by Letters Patent, is—

1. A roof structure comprising supporting-bars, means carried thereby for supporting the adjacent edges of glass panes, uprights extending from said bars between the panes, and bars supported by said uprights above the panes and parallel with the supporting-bars.

2. A roof structure comprising supporting-bars, brackets supported by these bars at a suitable distance from each other, vertical bolts projecting from these brackets, flat iron bars connecting the brackets of one bar with each other, elastic strips on said iron bars serving as supports for the edges of the panes of glass, elastic strips covering the adjacent edges of the panes of glass, protecting-caps covering said elastic strips, springs for pressing said caps and consequently the edges of the panes of glass firmly on their seats, and bars resting on setoffs on the upper ends of the bolts running parallel to the supporting-bars substantially as described and shown and for the purpose set forth.

3. Improved bars used for the support of panes of glass constituting the roofs of greenhouses and other glass-covered buildings, comprising in combination supporting-bars, brackets supported by these bars at a suitable distance from each other, vertical bolts projecting from these brackets, flat iron bars connecting the brackets of one bar with each other, elastic strips on said iron bars serving as supports for the edges of the panes of glass, elastic strips covering the adjacent edges of the panes of glass, protecting-caps covering said elastic strips, spiral springs coiled around the vertical bolts pressing said caps and consequently the edges of the panes of glass firmly on their seats, and bars resting on set-offs on the upper ends of the bolts running parallel to the supporting-bars substantially as described and shown and for the purpose set forth.

4. Improved bars used for the support of panes of glass constituting the roofs of greenhouses and other glass-covered buildings, comprising in combination U-shaped iron bars, ⊓-shaped brackets inserted into these bars at a suitable distance from each other, two grooves in the upper surface of said brackets forming bridges between them, vertical bolts screwed into these bridges, flat iron bars connecting the bridges of one bar with each other, felt strips on said iron bars serving as supports for the edges of the panes of glass, felt strips covering the adjacent edges of the panes of glass, protecting-caps covering said felt strips, spiral springs coiled around the vertical bolts pressing said caps and consequently the edges of the panes of glass firmly on their seats, and ⊓-shaped iron bars resting on set-offs on the upper ends of the bolts running parallel to the supporting-bars, substantially as described and shown and for the purpose set forth.

5. A roof structure comprising channel-shaped supporting-bars, brackets having their ends turned down and fitted within the sides of the channel-shaped bars, said brackets being secured to the said bars, means for supporting the adjacent edges of glass panes, uprights extending between the panes, and bars supported by said uprights above the panes and parallel with the supporting-bars.

In testimony whereof I have hereunto set my hand in presence of two subscribing witnesses.

JOHANNES DEGENHARDT.

Witnesses:
HENRY HASPER,
WOLDEMAR HAUPT.